United States Patent Office 3,836,680
Patented Sept. 17, 1974

3,836,680
PROTEIN-FREE ALIMENTARY PASTES AND A
PROCESS FOR THEIR PRODUCTION
Silvio Salza, 46 Via Sottoborgo, 56100 Pisa, Italy
No Drawing. Filed July 11, 1972, Ser. No. 270,737
Claims priority, application Italy, July 21, 1971,
69,449/71; Nov. 30, 1971, 70,938/71
Int. Cl. A23l 1/16
U.S. Cl. 426—158
9 Claims

ABSTRACT OF THE DISCLOSURE

Producing protein-free starch base alimentary pastes by forming the desired shapes of alimentary pastes from a mixture of ungelatinized starch and gelatinized starch, the latter acting as a binder for the former.

---

The invention refers to the production of alimentary pastes which are substantially free of glutens and therefore of proteins, and which are especially suitable for the nourishment of persons suffering from chronic uraemia and other dysfunctions.

The basic ingredient of such aproteinic pastes is starch. The origin of the starch, whether from cereals, roots, potatoes, etc. is of no importance.

In the manufacture of the common alimentary pastes, gluten acts as a binder. However, this substance is proteinic. It has been suggested to use as a binder in protein free pastes, in lieu of gluten, cellulose derivatives, such as carboxymethylcellulose or natural polysaccharide gums, such as guar gum or alginic acid.

The fundamental problem, connected with the manufacture of alimentary pastes in general and of protein free pastes in particular, is that of their stability to cooking, which means that, when cooked, the paste does not turn sticky and does not agglomerate into a gluey mass. Under this viewpoint, a substitution of gluten by cellulose derivatives and/or natural polysaccharide gums has not solved all the problems; further, the presence of these rather costly substances in the food may in some cases be unadvisable, owing to their effects upon some physiological functions.

Consequently it is the main object of the invention to supply a procedure producing a starch composition capable of being formed, as by extrusion, into any possible shape of alimentary paste, or pasta, such as spaghetti, macaroni, rigatoni, etc., such composition being mainly formed of a mixture of ungelatinized starch with gelatinized starch, the latter acting as a binder for the former. To promote the mutual dispersion of these two constituents in the mixture, small amounts of monoglycerides of the alimentary fatty acids of $C_{14}$ to $C_{18}$ are added as emulsifiers, together with suitable dyes to confer a desired color to the resulting alimentary paste.

The procedure of the invention can be carried out either in two stages or in a single stage, the resulting products being identical in their properties.

In the two-stage procedure, merely one part of the starch is premixed and gelatinized in the presence of the necessary amount of water and emulsifiers, by heating it, under continuous mixing, to the temperature where its gelatinization starts, which, according to the type of starch used, is in the range of 60–75° C. Subsequently, the remaining starch is added and the resulting mass is cooked till the said mixture is obtained, which is thereafter immediately extruded to the desired shapes, said extrusion causing the quick cooling of the mass and consequently the rapid interruption of the cooking process.

In the single stage procedure, the total amount of starch is kneaded, in the presence of said monoglycerides as emulsifiers and the necessary amount of water. This first portion of the stage is performed at a temperature which does not reach the temperature where the gelatinization of the starch begins until the mixture has been kneaded to a completely homogeneous mass. From this point on the mass is cooked at a high temperature, up to a point where only part of the starch is converted to starch paste, and thereafter it is passed through the extruder and cooled.

The proportion of said monoglycerides ranges from 0.8 to 1.2 (preferably 1.0) parts by weight for 100 parts by weight of the total starch used. The proportion of water depends on the consistency which is to be conferred to the mass during its extrusion, in view of the type of alimentary paste which has to be produced. Also the evaporation of the water during the process must be taken into account, unless the whole procedure is carried out in a closed apparatus, such as a closed combination mixer-extruder unit. For conventional pastes, 52 to 64, preferably 57 to 59 parts by weight of water are used for 100 parts by weight of the total amount of starch. Any type of starch may be used for this process, such as starch produced from wheat, potatoes, rice, corn, etc. However, as it is mentioned in the examples, preferably a mixture of various starches is preferred for best results.

Independently of whether the procedure is performed in a single or in two stages, the cooking proper is regulated so that the mixture reaches a temperature of 80–90° C. within 12 minutes when using an open apparatus, that is when cooking under atmospheric pressure, and a temperature 110–120° C., preferably between 110 and 115° C. within 6–10 minutes, preferably within 8 minutes, when using a closed apparatus, that is when cooking under a higher pressure. This cooking stage is of a fundamental importance for the process, because tests have shown that the chemical and physical interactions which confer to the final product its stability to cooking develop during this stage. If the mass is not cooked or it is not cooked at the temperature and for the times indicated above, the resulting products falls far below the necessary requirements.

The following examples may serve for a better understanding of the process:

12 kg. of potato starch, 30 kg. of corn starch and 18 kg. of rice starch are kneaded in a closed mixer with 35 litres water in the presence of 0.600 kg. of fatty acid monoglycerides of $C_{14}$ to $C_{16}$ as emulsifiers and a suitable, officially permitted dye. The mixture is heated so that its temperature reaches 65° C. when it has already been kneaded into a homogeneous mass. Thereafter begins the cooking proper during which the temperature of the mass is raised linearly, under continuous mixing, within 8 minutes to 110° C., at the end of which period the heat supply is interrupted, the mass passed through the extruder to form spaghetti and conveyed into a drying chamber. Within approximately 15 seconds from its issue from the extruder, the temperature of the spaghetti has dropped below 65° C. and when removed from the conveyor, it is already almost dry and its temperature has sunk to 35–40° C.

The same process may be carried out in two stages. In the first stage, part of the 60 kg. of the already mentioned mixture of starches is kneaded, together with 35 litres of water and, in the presence of 0.600 kg. of said monoglycerides in a closed mixer-extruder, while the temperature of the mixer is raised so that 65° C. is reached when the mixture has become completely homogeneous. Subsequently, the remaining starch is added and the temperature of the mixture is raised, under continuous kneading, to reach 110–115° C. at the end of 8 minutes. The remaining operations as well as the results are identical in both examples.

100 g. of the spaghetti obtained with the methods used in both examples were cooked for 8 minutes in 1 litre water, strained and poured into a soup plate. They could be stirred and lifted with a fork without difficulty, since they neither became entangled or pasted together nor broke.

What is claimed is:

1. A process for the production of a protein free, starch-base alimentary pasta from a mixture of ungelatinized starch and gelatinized starch, the latter acting as a binder for the former, comprising:

providing a mixed and kneaded homogeneous composition consisting essentially of gelatinized starch, ungelatinized starch and an emulsifier in water, wherein said composition comprises 52–64 parts by weight of said water per 100 parts by weight of the total quantity of said gelatinized starch and ungelatinized starch and an amount sufficient of said gelatinized starch to bind said ungelatinized starch so that the pasta has stability to cooking;

cooking said composition at a temperature of about 85–120° C. for about 6–12 minutes; and extruding said composition to provide elongated, protein-free alimentary pasta.

2. A procedure according to claim 1, comprising the preliminary step of kneading all the starch, in the presence of the emulsifier, in water at a temperature of 60–75° C.; and once the mixture has been kneaded to a homogeneous mass, then effecting said cooking of said homogeneous mass.

3. A procedure according to claim 2, wherein the cooking of the starch is performed under atmospheric pressure and the homogeneous mass of starch is heated for 10–12 minutes to a temperature of 85–95° C.

4. A procedure according to claim 2, wherein the cooking of the starch is performed at a pressure above atmospheric pressure and the mass of starch is heated, for 6–10 minutes 110–115° C.

5. A procedure according to claim 2, wherein the emulsifier is a fatty acid monoglyceride of $C_{14}$ to $C_{18}$, and is added to the mixture in the proportion of 0.8 to 1.2, weight percent of the total starch entering said mixture.

6. A procedure according to claim 1, wherein part of the total amount of starch is mixed with water and said emulsifier and worked to a homogeneous mass and then heated at a temperature of 60–75° C. to provide said gelatinized starch; and then the remaining starch, ungelatinized, is added and kneaded into said mass while the whole is cooked for a period of 10–12 minutes at a temperature of 85–95° C.

7. A procedure according to claim 1, wherein part of the total amount of starch is mixed with water and said emulsifier and worked to a homogeneous mass and then heated at a temperature of 60–75° C. to provide said gelatinized starch and then the remaining starch, ungelatinized, is added and kneaded into said mass while the whole is cooked for a period of 6 to 10 minutes at a temperature of 110–115° C.

8. A procedure according to claim 1, wherein the proportion between starch, water and emulsifier is about 60:35:0.6.

9. The protein-free alimentary pasta produced by the process of claim 1.

References Cited

UNITED STATES PATENTS

| | | | |
|---|---|---|---|
| 2,919,986 | 1/1960 | Johnson | 99—94 |
| 3,113,869 | 12/1963 | Lee | 99—85 |
| 3,138,462 | 6/1964 | Katz et al. | 99—85 |
| 3,150,978 | 9/1964 | Campfield | 99—1 |
| 3,162,536 | 12/1964 | Kaufmann | 99—85 |
| 3,652,294 | 3/1972 | Marotta et al. | 99—1 X |

JAMES R. HOFFMAN, Primary Examiner

U.S. Cl. X.R.

426—346

──── DETACH HERE BEFORE MAILING THE TYPED CERTIFICATE TO THE PATENT OFFICE ────

UNITED STATES PATENT OFFICE
CERTIFICATE OF CORRECTION

Patent No. 3,836,680                        Dated September 17, 1974

Inventor(s) Silvio SALZA

It is certified that error appears in the above-identified patent and that said Letters Patent are hereby corrected as shown below:

Column 3, line 38, after "minutes" insert --to--

Signed and sealed this 7th day of January 1975.

(SEAL)
Attest:

McCOY M. GIBSON JR.                    C. MARSHALL DANN
Attesting Officer                      Commissioner of Patents